United States Patent

Lucas et al.

[11] Patent Number: 5,352,639
[45] Date of Patent: Oct. 4, 1994

[54] TELLURIUM AND SELENIUM HALIDE-BASED GLASSES, THEIR PREPARATION AND USE

[75] Inventors: Jacques Lucas, Betton; Xiang H. Zhang, Rennes, both of France

[73] Assignee: Centre National de la Recherche Scientifique (CNRS), Paris, France

[21] Appl. No.: 961,890

[22] PCT Filed: Jul. 12, 1991

[86] PCT No.: PCT/FR91/00574

§ 371 Date: Mar. 11, 1993

§ 102(e) Date: Mar. 11, 1993

[87] PCT Pub. No.: WO92/00926

PCT Pub. Date: Jan. 23, 1992

[30] Foreign Application Priority Data

Jul. 12, 1990 [FR] France .................... 90 08892

[51] Int. Cl.⁵ .................................... C03C 3/32
[52] U.S. Cl. ........................ 501/40; 501/151; 501/904
[58] Field of Search ................. 501/40, 151, 904

[56] References Cited

FOREIGN PATENT DOCUMENTS 2141423  12/1984  United Kingdom .

OTHER PUBLICATIONS

"Vitrification, switching and memory effects of glasses in potassium-arsenic (antimony)-sulfur (selenium, tellurium)-bromine (iodine) systems", Khiminets et al., Chem. Abstracts, vol. 82, No. 2, Jan. 1975, Abstract No. 10326t.

"Chalcohalide glasses", Sanghera et al., Journal of Non-Crystalline Solid, vol. 103, Nos. 2-3, Jul. 1988, pp. 155-178.

"Electrophotographic properties of selenium tellurium-antimony-halogen alloy", Onozuka et al., Chem. Abstracts, vol. 106, No. 20, May 1987, Abstract No. 165971n.

*Primary Examiner*—Karl Group
*Assistant Examiner*—Chris Gallo
*Attorney, Agent, or Firm*—Cushman, Darby & Cushman

[57] ABSTRACT

Vitreous solid compositions of formula I:

$$Te_w Se_y X_x Z_z \qquad (I)$$

wherein

X represents at least one halogen selected from chlorine, bromine and iodine,

Z represents at least one element selected from As, Sb and Bi, w, x, y and z represent the molar percentages respectively of elements Te, X, Se and Z, w being a number varying from 5 to 50, x being a number varying from 5 to $x_1$, y being a number varying from 5 to 80, z being a number varying from 5 to $z_1$, the numbers w, x, y and z being such that the sum $(w+x+y+z)$ is equal to 100, the numbers $x_1$ and $z_1$ being such that:

when X represents mostly iodine, $x_1=50$ and $z_1=60$, when X represents mostly bromine, $x_1=60$ and $z_1=50$, and when X represents mostly chlorine, $x_1=60$ and $z_1=40$, it being understood that the molar percentage of Bi, when it is present, is not greater than 12 and that the molar percentage of the element Sb, when it is present, is not greater than 20; their preparation and their use principally in the field of infrared transmission.

20 Claims, No Drawings

TELLURIUM AND SELENIUM HALIDE-BASED GLASSES, THEIR PREPARATION AND USE

The present invention has for an object new tellurium halide based glasses, their preparation and their use principally in the field of infrared transmission.

In French patent application 2,594,115, there are described glasses based on the halide of tellurium and selenium or sulfur which possess good transmission properties in the infrared. However, these glasses have relatively low glass transition temperatures which do not permit their use at high temperatures. Moreover, these glass transition temperatures vary only very slightly when the amounts of sulfur or selenium are varied.

It has now been discovered that it is possible to improve the properties of glasses based on the halide of tellurium and selenium by the addition of a supplemental constituent such as arsenic, antimony or bismuth.

It has been discovered, in particular, that it is possible to increase the glass transition temperature by increasing the amount of this supplemental constituent, and that it even becomes possible to adjust the glass transition temperature to a predetermined value by regulating the amount of the said supplemental constituent. It is thus possible to obtain, because of the invention, glasses based on the halide of tellurium and selenium having glass transition temperatures greater than 130° C., and even greater than 150° C., although for glasses based on the halide of tellurium and sulfur or selenium, the glass transition temperature rarely exceeds 80° C.

Moreover, the glasses of the invention are less brittle than glasses based on the halide of tellurium and selenium. They also exhibit the advantage of permitting to obtain large pieces by hot pressing, when the glass is in its plasticity zone, at a temperature greater than several dozens of degrees to the glass transition temperature. These glasses can be formed by moderate pressure, in pyrex glass enclosures. It has been noted in effect that the glasses of the invention, thus formed, are capable of duplicating the polished surface of the pyrex mold, so that later the polishing of the piece obtained is not necessary, that which permits to considerably lower the cost of production.

Besides, the glasses of the invention can be deposited in thin layers to obtain antireflection deposits or integrated optics. They also permit to easily produce preforms having double index for the production of optical fibers.

The present invention has then for an object vitreous solid compositions of formula I:

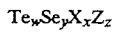  (I)

wherein
X represents at least one halogen selected from chlorine, bromine and iodine,
Z represents at least one element selected from As, Sb and Bi,
w, x, y and z represent the molar percentages respectively of elements Te, X, Se and Z,
w being a number varying from 5 to 50,
x being a number varying from 5 to $x_1$,
y being a number varying from 5 to 80,
z being a number varying from 5 to $z_1$,
the numbers w, x, y and z being such that the sum $(w+x+y+z)$ is equal to 100,
the numbers $x_1$ and $z_1$ being such that:
when X represents mostly iodine, $x_1=50$ and $z_1=60$,
when X represents mostly bromine, $x_1=60$ and $z_1=50$, and
when X represents mostly chlorine, $x_1=60$ and $z_1=40$,
it being understood that the molar percentage of Bi, when it is present, is not greater than 12 and that the molar percentage of the element Sb, when it is present, is not greater than 20.

The restrictive conditions concerning the maximum amount of antimony and bismuth are conditions generally permitting to obtain glasses by simple cooling of the mixture of constituents in the melted state, without rapid cooling (without tempering).

Among the vitreous compositions of the invention, mention can be made in particular of:
those for which X represents iodine, bromine or their mixtures;
those for which w is a number varying from 10 to 40 and y is a number varying from 5 to 65;
those for which z is a number at least equal to 10.

Among the compositions of the invention, certain ones are particularly interesting in that their thermal analysis permits to observe no phenomenon linked to a crystallization. In other words, these compositions form glasses which are not susceptible to devitrification. Such compositions can be found principally in the following fields:

(a) compositions for which w is a number varying from 15 to 25, x from 5 to 15, y from 20 to 60 and z from 10 to 50; and in particular for which y can vary from 30 to 50 and/or z from 20 to 40; and principally for which y can vary from 35 to 45 and/or z can vary from 25 to 35; these compositions being principally those for which Z represents mostly As (preferably Z represents As), and in particular those for which X represents mostly iodine (X represents iodine preferably);

(b) compositions for which w can vary from 5 to 20, x from 5 to 15, y from 55 to 65 and z from 10 to 25; in particular those for which w can vary from 10 to 20 and/or z can vary from 10 to 20; these compositions principally being those for which Z represents mostly As (preferably Z represents As), and in particular those for which X represents mostly iodine (X representing iodine preferably);

(c) composition for which X represents mostly bromine, w is a number varying from 15 to 25, x from 5 to 15, y from 45 to 55 and z from 15 to 25, X being bromine preferably, and in particular for which Z represents mostly As (and As preferably).

The invention also has for an object a process for preparing the glass compositions such as defined above.

This process is characterized by the fact that there is mixed, the amounts indicated by formula I such as defined above, a source of tellurium with a source of halogen, a source of selenium and a source of element Z, that the said mixture is heated under an inert atmosphere or under a vacuum at a temperature sufficient to obtain complete fusion of the starting products, that the resulting liquid is maintained at the said temperature for a time sufficient to homogenize the said liquid mixture, that, if desired, the said mixture is formed, and that it is cooled so as to obtain a vitreous solid.

As sources of the starting elements, generally these elements themselves are employed. Also as sources defined compounds containing these elements can be used. For example, the source of halogen and tellurium can be $TeCl_4$, $TeBr_4$, etc.

Preferably, the preparation is carried out in a sealed tube, after having subjected it to a vacuum. For example, Pyrex glass tubes can be employed.

The glass can also be transferred to the softened state in a mold, as indicated above, to obtain by moderate pressure a large piece of the desired form.

The temperature at which the starting product is heated can be determined in each case by routine experimentation.

Generally, the mixture of the starting products is heated to a temperature in the order of 300° to about 600° C. For cooling, a tempering is generally not necessary. It suffices to let the composition cool to ambient temperature.

The glass compositions of the invention can also be obtained in the form of thin layers, in particular by cathodic pulverization.

They can, in particular, be fibered and serve as a wave guide for light emitted by lasers with $CO_2$. Besides, their wide transmission band permits their use in analysis devices of infrared rays or thermal imagery.

The glasses of the invention can principally be deposited in the form of vitreous thin layers on substrates of varied nature. By cathodic pulverization, guiding structures can be effected with index variation being able to make use of wave guide plate for integrated optic, or to coat optics of clearly inferior index layers with, for example, germanium.

With the glasses of the invention, it is also possible to prepare glass preforms having double index by one of the two following methods.

According to a first method, a glass bar having a refraction index $n_1$ is first prepared having for example a length of 100 mm and a diameter of 6 mm. This bar is inserted in a cylindrical crucible having an inner diameter slightly greater than the diameter of the glass bar previously prepared, for example an inner diameter of 10 mm. The said crucible contains a glass according to the invention having an index $n_2$ ($n_2$ being less than $n_1$), the temperature in the crucible being such that this second glass is liquid and viscous. The whole is cooled and a preform is obtained having two indices, and which can then be fibered according to conventional methods.

The second method consists in maintaining the $n_1$ index bar in the center of a tube having an inner diameter slightly greater than the diameter of the bar, for example 10 mm. Another glass according to the invention having an $n_2$ index lower than $n_1$ is then poured into the tube, the said second glass being at a temperature sufficient so that the second glass is in the softened state and can be poured into the tube by filling the space around the bar. The whole is then cooled as before.

The following nonlimiting examples illustrate the invention.

EXAMPLE 1

Glass having the composition: $Te_{20}Se_{60}I_{10}As_{10}$

The starting products are purified elements, which are introduced, in the requisite amounts, in a silica tube. A vacuum is created in the portion of the silica tube situated above the mixture of the constituents. The tube is then sealed and heated to 350° C. for two hours to obtain good homogenization. The tube is then cooled to ambient temperature.

The resulting glass has a glass transition temperature, measured by differential thermal analysis, with a heating rate of 10° C./m: $Tg=80°$ C.

In a similar manner, glasses containing iodine and having the following composition have been prepared:

| Example | $Te_w$ | $Se_x$ | $I_y$ | $As_z$ | $Sb_z$ | $Tg(°C.)$ |
|---|---|---|---|---|---|---|
| 2 | $Te_{20}$ | $Se_{50}$ | $I_{10}$ | $As_{20}$ | | 87 |
| 3 | $Te_{20}$ | $Se_{40}$ | $I_{10}$ | $As_{30}$ | | 110 |
| 4 | $Te_{20}$ | $Se_{30}$ | $I_{10}$ | $As_{40}$ | | 117 |
| 5 | $Te_{20}$ | $Se_{20}$ | $I_{10}$ | $As_{50}$ | | 135 |
| 6 | $Te_{20}$ | $Se_{10}$ | $I_{10}$ | $As_{60}$ | | 152 |
| 7 | $Te_{17}$ | $Se_{58}$ | $I_8$ | $As_{17}$ | | 67 |
| 8 | $Te_{15}$ | $Se_{54}$ | $I_8$ | $As_{23}$ | | 81 |
| 9 | $Te_{14}$ | $Se_{50}$ | $I_7$ | $As_{29}$ | | 123 |
| 10 | $Te_{10}$ | $Se_{60}$ | $I_{10}$ | $As_{20}$ | | 82 |
| 11 | $Te_5$ | $Se_{60}$ | $I_{10}$ | $As_{25}$ | | 95 |
| 12 | $Te_{30}$ | $Se_{10}$ | $I_{10}$ | $As_{50}$ | | 140 |
| 13 | $Te_{25}$ | $Se_5$ | $I_{10}$ | $As_{60}$ | | 154 |
| 14 | $Te_{10}$ | $Se_{20}$ | $I_{10}$ | $As_{60}$ | | 145 |
| 15 | $Te_{20}$ | $Se_{40}$ | $I_{30}$ | | $Sb_{10}$ | 50 |
| 16 | $Te_{25}$ | $Se_{40}$ | $I_{30}$ | | $Sb_5$ | 61 |
| 17 | $Te_{20}$ | $Se_{50}$ | $I_{10}$ | | $Sb_{20}$ | 80 |

In a similar manner, glasses having the following composition have been prepared:

| $Te_{20}$ | $Se_{60}$ | $I_{10}$ | $Sb_{10}$ |
| $Te_{35}$ | $Se_{25}$ | $I_{20}$ | $As_{20}$ |
| $Te_{35}$ | $Se_{40}$ | $I_5$ | $As_{20}$ |
| $Te_{30}$ | $Se_{20}$ | $I_{30}$ | $As_{20}$ |
| $Te_{10}$ | $Se_{60}$ | $I_{10}$ | $As_{20}$ |
| $Te_{10}$ | $Se_{20}$ | $I_{10}$ | $As_{60}$ |

In a similar manner, glasses containing bromine and having the following composition have been prepared.

| Example | $Te_w$ | $Se_x$ | $Br_y$ | $As_z$ | $Bi_z$ | $Tg(°C.)$ |
|---|---|---|---|---|---|---|
| 18 | $Te_{20}$ | $Se_{50}$ | $Br_{10}$ | $As_{40}$ | | 115 |
| 19 | $Te_{20}$ | $Se_{50}$ | $Br_{10}$ | $As_{20}$ | | 89 |
| 20 | $Te_{20}$ | $Se_{40}$ | $Br_{10}$ | $As_{30}$ | | 107 |
| 21 | $Te_{20}$ | $Se_{20}$ | $Br_{10}$ | $As_{50}$ | | 129 |
| 22 | $Te_{20}$ | $Se_{60}$ | $Br_{10}$ | $As_{10}$ | | 80 |
| 23 | $Te_{18}$ | $Se_{64}$ | $Br_9$ | $As_9$ | | 70 |
| 24 | $Te_{18}$ | $Se_{46}$ | $Br_{18}$ | $As_{18}$ | | 83 |
| 25 | $Te_{23}$ | $Se_{49}$ | $Br_{23}$ | | $Bi_5$ | 70 |
| 26 | $Te_{36}$ | $Se_{27}$ | $Br_{27}$ | | $Bi_{10}$ | 75 |

In a similar manner, glasses containing chlorine and having the following composition have been prepared:

| Example | $Te_w$ | $Se_x$ | $Cl_y$ | $As_z$ | $Tg(°C.)$ |
|---|---|---|---|---|---|
| 27 | $Te_{20}$ | $Se_{60}$ | $Cl_{10}$ | $As_{10}$ | 90 |
| 28 | $Te_{20}$ | $Se_{50}$ | $Cl_{10}$ | $As_{20}$ | 104 |
| 29 | $Te_{20}$ | $Se_{40}$ | $Cl_{10}$ | $As_{30}$ | 122 |

To introduce the chlorine into the starting mixture, the requisite amount of chlorine is reacted with the Te+Se+As mixture. There can also be used, as a source of chlorine, at least one chloride of these three elements, in the anhydrous state, in a suitable amount.

We claim:
1. Solid vitreous compositions of formula I:

$$Te_wSe_yX_xZ_z \qquad (I)$$

wherein
- X represents at least one halogen selected from chlorine, bromine and iodine,
- Z represents at least one element selected from As, Sb and Bi,
- w, x, y and z represent the molar percentages respectively of the elements Te, X, Se and Z,
- w being a number varying from 10 to 40,
- x being a number varying from 5 to $x_1$,
- y being a number varying from 5 to 65,
- z being a number varying from 5 to $z_1$,
- the numbers w, x, y and z being such that the sum $(w+x+y+z)$ is equal to 100,
- the numbers $x_1$ and $z_1$ being such that:
  - when X represents greater than 50% iodine, $x_1=50$ and $z_1=60$,
  - when X represents greater than 50% bromine, $x_1=60$ and $z_1=50$, and
  - when X represents greater than 50% chlorine, $x_1=60$ and $z_1=40$,
- it being understood that the molar percentage of Bi, when it is present, is not greater than 12 and that the molar percentage of the element Sb, when it is present, is not greater than 20.

2. Vitreous compositions according to claim 1, characterized by the fact that X represents iodine, bromine or their mixtures.

3. Compositions according to claim 1, characterized by the fact that z is a number at least equal to 10.

4. Compositions according to claim 3, characterized by the fact that w is a number varying from 15 to 25, x from 5 to 15, y from 20 to 60, and z from 10 to 50.

5. Compositions according to claim 4, characterized by the fact that y can vary from 30 to 50 and/or z from 20 to 40.

6. Compositions according to claim 4, characterized by the fact that y can vary from 35 to 45 and/or z can vary from 25 to 35.

7. Compositions according to claim 3, characterized by the fact that w can vary from 10 to 20, x from 5 to 15, y from 55 to 65 and z from 10 to 25.

8. Compositions according to claim 7, characterized by the fact that w can vary from 10 to 20 and/or z can vary from 10 to 20.

9. Compositions according to claim 3, characterized by the fact that w can vary from 10 to 20, x from 15 to 25, y from 25 to 35 and z from 30 to 40.

10. Composition according to claim 1, characterized by the fact that Z represent greater than 50% As.

11. Compositions according to claim 10, characterized by the fact that Z represents As.

12. Compositions according to claim 1, characterized by the fact that X represents greater than 50% iodine.

13. Compositions according to claim 12, characterized by the fact that X represent iodine.

14. Compositions according to claim 3, characterized by the fact that X represents greater than 50% bromine, w is a number varying from 15 to 25, x from 5 to 15, y from 45 to 55 and z from 15 to 25.

15. Compositions according to claim 14, characterized by the fact that X represents bromine.

16. Compositions according to claim 14, characterized by the fact that Z represents greater than 50% As.

17. Process for preparing vitreous compositions such as defined in claim 1, characterized by the fact that one mixes, in the amounts indicated by formula I, a source of tellurium with a source of halogen, a source of selenium, and a source of the element Z, that one heats the said mixture in an inert atmosphere or under a vacuum to a temperature sufficient to obtain a complete fusion of the starting products, that one maintains the resulting liquid at said temperature for a time sufficient to homogenize the liquid mixture, that, if desired, one puts it into a form, and that one cools it to obtain a vitreous solid.

18. Process according to claim 17, characterized by the fact that the forming step comprises transferring it in a mold to obtain by moderate pressure a large piece of the desired form.

19. Process according to claim 17, characterized by the fact that, to obtain a glass preform having a double index, one prepares a glass bar that one places in the center of a cylindrical crucible having an interior diameter greater than the diameter of the bar, the said crucible containing, in the liquid and viscous state, a glass having an index lower than that of said glass bar, and that one lets the whole to cool.

20. Process according to claim 17, characterized by the fact that, to obtain a glass preform having a double index, one prepares a glass bar that one places at the center of a cylindrical crucible having an interior diameter greater than the diameter of the bar, that one pours into the crucible a second glass having a lower index, in the softened state, so that it fills the space around the bar, and that one lets the whole to cool.

* * * * *